(12) United States Patent
Lent et al.

(10) Patent No.: US 8,911,892 B2
(45) Date of Patent: Dec. 16, 2014

(54) BATTERY MODULE MOUNTING ASSEMBLY AND METHOD FOR MOUNTING A BATTERY MODULE TO A BASE PLATE

(75) Inventors: Steven Lent, Canton, MI (US); Heekook Yang, Troy, MI (US); Robert Merriman, Shelby Township, MI (US); Michael P. Garascia, Waterford, MI (US)

(73) Assignee: LG Chem, Ltd., Seoul (KR)

( * ) Notice: Subject to any disclaimer, the term of this patent is extended or adjusted under 35 U.S.C. 154(b) by 190 days.

(21) Appl. No.: 13/476,089

(22) Filed: May 21, 2012

(65) Prior Publication Data

US 2013/0309560 A1    Nov. 21, 2013

(51) Int. Cl.
*H01M 2/10* (2006.01)

(52) U.S. Cl.
USPC ............. 429/99; 429/100; 429/156; 429/159; 429/186

(58) Field of Classification Search
USPC ......................................................... 429/186
See application file for complete search history.

(56) References Cited

U.S. PATENT DOCUMENTS

| | | | |
|---|---|---|---|
| 2,933,548 A | 4/1960 | Walker | |
| 3,866,704 A | 2/1975 | Bowers et al. | |
| 4,936,409 A | 6/1990 | Nix et al. | |
| 5,378,555 A | 1/1995 | Waters et al. | |
| 5,558,949 A | 9/1996 | Iwatsuki et al. | |
| 6,230,834 B1 | 5/2001 | Van Hout et al. | |
| 6,648,090 B2 | 11/2003 | Iwase | |
| 8,110,300 B2 | 2/2012 | Niedzwiecki et al. | |
| 2006/0218823 A1 | 10/2006 | Olmr et al. | |
| 2009/0044997 A1 | 2/2009 | Picavet | |
| 2009/0166116 A1 | 7/2009 | Kiya et al. | |
| 2009/0197154 A1* | 8/2009 | Takasaki et al. ................ | 429/83 |
| 2009/0325049 A1 | 12/2009 | Niedzwiecki et al. | |

FOREIGN PATENT DOCUMENTS

| | | |
|---|---|---|
| JP | H07232564 A | 9/1995 |
| JP | 2012084239 A | 4/2012 |
| KR | 100503853 B1 | 7/2005 |
| WO | 2007100072 A | 9/2007 |
| WO | 2011026984 A1 | 3/2011 |

OTHER PUBLICATIONS

International Search Report for International application No. PCT/KR2013/004349 dated Aug. 27, 2013.

* cited by examiner

*Primary Examiner* — Milton I Cano
*Assistant Examiner* — Carmen Lyles-Irving
(74) *Attorney, Agent, or Firm* — Buckert Patent & Trademark Law Firm, P.C.; John F. Buckert (57) ABSTRACT

A battery module mounting assembly is provided. The assembly includes a base plate, and a first retention clamp having a first plate of uniform thickness. The first plate has a central rib, first and second base portions, and first and second clamping portions. The first and second base portions extend from first and second sides, respectively, of the central rib, and are fixedly attached to the base plate. The first clamping portion extends outwardly from the first base portion. The first clamping portion holds a first portion of a first battery module housing. The second clamping portion extends outwardly from the second base portion. The second clamping portion holds a second portion of a second battery module housing.

20 Claims, 10 Drawing Sheets

BATTERY MODULE MOUNTING ASSEMBLY AND METHOD FOR MOUNTING A BATTERY MODULE TO A BASE PLATE

BACKGROUND

The inventors herein have recognized a need for an improved battery module mounting assembly and a method for mounting a battery module to a base plate.

SUMMARY

A battery module mounting assembly in accordance with an exemplary embodiment is provided. The battery module mounting assembly includes a base plate, and a first retention clamp having a first plate of substantially uniform thickness. The first plate has a central rib, first and second base portions, and first and second clamping portions. The central rib extends longitudinally along a length of the first plate. The first and second base portions are coupled to and extend from first and second sides, respectively, of the central rib. The first and second base portions are fixedly attached to the base plate. The first clamping portion is coupled to and extends upwardly and outwardly from the first base portion. The first clamping portion is configured to engage and hold a first portion of a first battery module housing. The second clamping portion is coupled to and extends upwardly and outwardly from the second base portion. The second clamping portion is configured to engage and hold a second portion of a second battery module housing.

A method for mounting a battery module to a base plate in accordance with another exemplary embodiment is provided. The method includes welding a first retention clamp having a first plate of substantially uniform thickness to the base plate. The first plate has a central rib, first and second base portions, and first and second clamping portions. The central rib extends longitudinally along a length of the first plate. The first and second base portions are coupled to and extend from first and second sides, respectively, of the central rib. The first and second base portions are fixedly attached to the base plate. The first clamping portion is coupled to and extends upwardly and outwardly from the first base portion. The second clamping portion is coupled to and extends upwardly and outwardly from the second base portion. The method further includes disposing a first battery module housing on the base plate such that the first clamping portion engages and holds a first portion of the first battery module housing. The method further includes disposing a second retention clamp having a second plate of substantially uniform thickness on the base plate that engages and holds a second portion of the first battery module housing. The second plate has a third base portion and a third clamping portion coupled to and extending outwardly from the third base portion. The third clamping portion extends toward the first retention clamp. The method further includes coupling the second retention clamp to the base plate utilizing at least one bolt.

DETAILED DESCRIPTION

Figure 1:
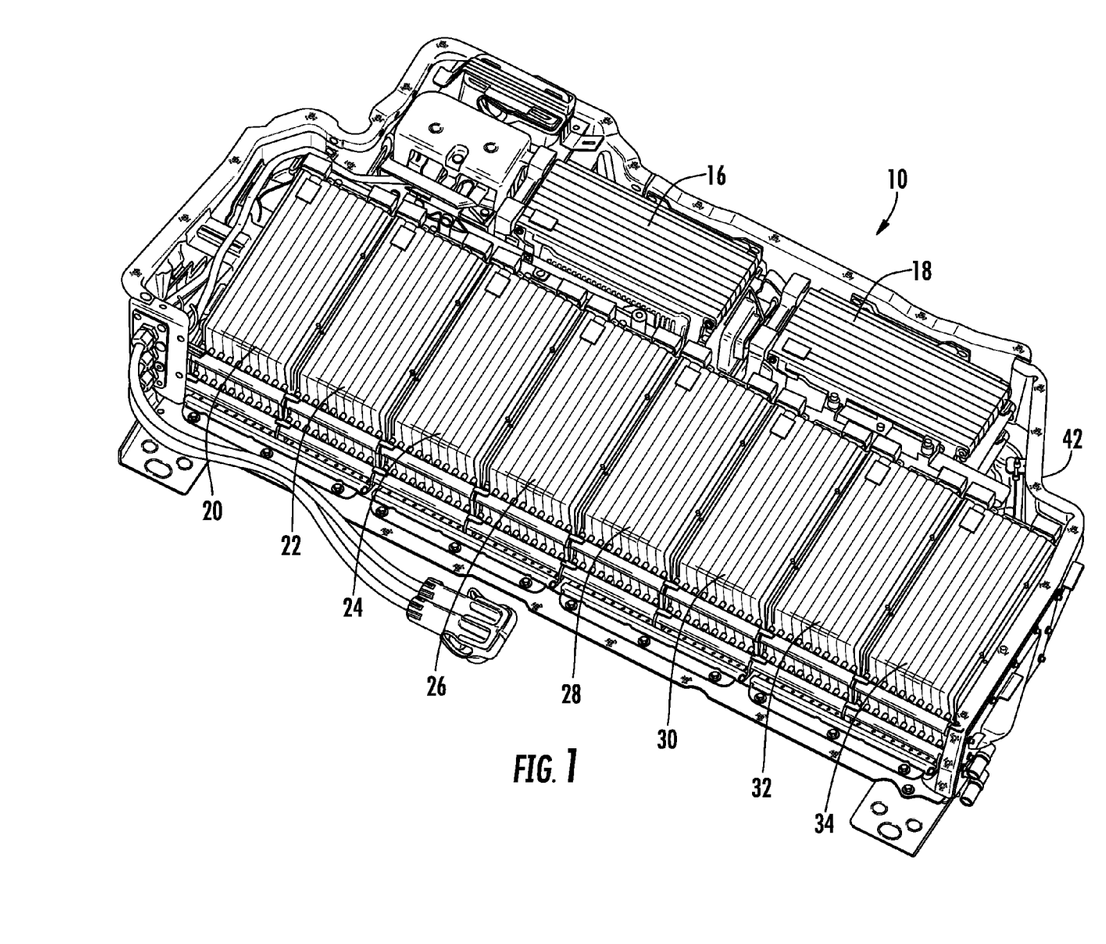
FIG. 1 is a block diagram of a battery mounting system in accordance with an exemplary embodiment.
Figure 2:
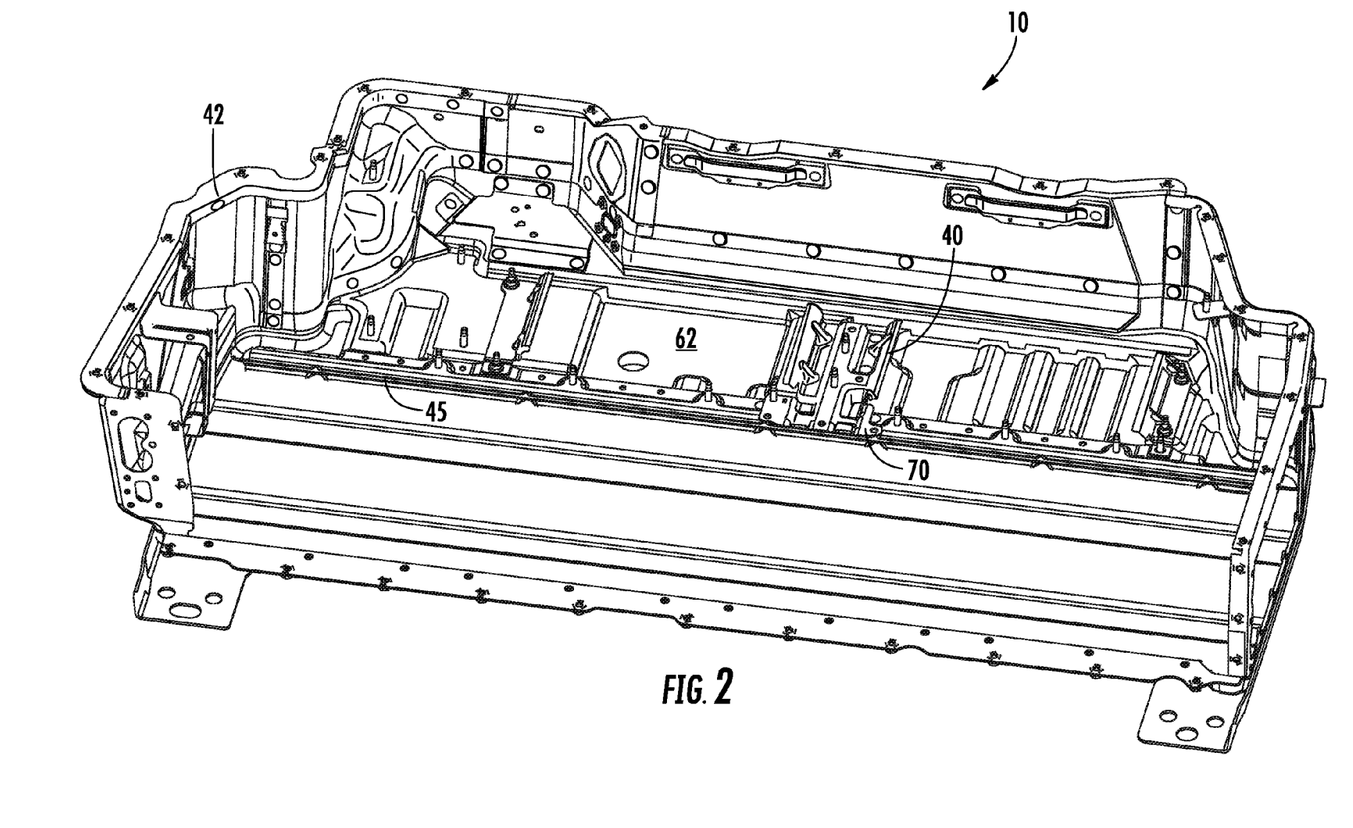
FIG. 2 is a schematic of a portion of the battery mounting system of FIG. 1.

Referring to FIGS. 1-2, a battery pack 10 in accordance with an exemplary embodiment is provided. The battery pack 10 includes battery modules 16, 18, 20, 22, 24, 26, 28, 30, 32, 34, a battery module mounting assembly 40, a sidewall 42, and a support rail 45.

The battery modules 16-34 are each provided to generate an operational voltage for powering an electric vehicle or a hybrid electric vehicle. The battery modules 16-34 are disposed on a base plate 62. In one exemplary embodiment, the battery modules 16-34 are electrically coupled in series to one another. Further, the battery modules 16-34 are lithium-ion battery modules. Of course, in alternative embodiments, the battery modules 16-34 could be other types of battery modules known to those skilled in the art.

Figure 3:
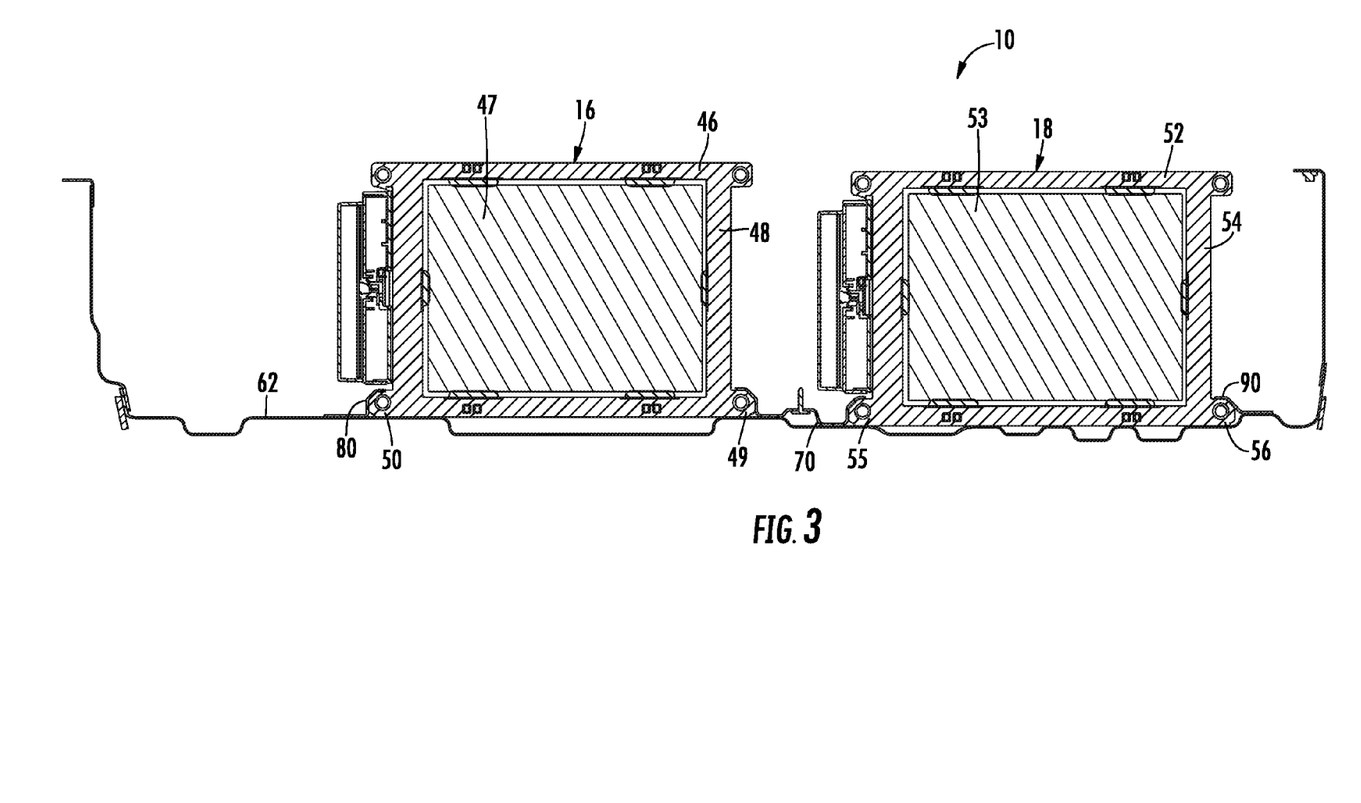
FIG. 3 is a cross-sectional schematic of a portion of the battery mounting system of FIG. 1.

Referring to FIG. 3, the battery module 16 includes a battery module housing 46 holding at least one battery cell 47 therein. The battery module housing 46 has a rectangular ring-shaped frame 48 and first and second attachment portions 49, 50 extending from opposite sides of the rectangular ring-shaped frame 48. In one exemplary embodiment, the battery cell 47 is a lithium-ion battery cell. Of course, in alternative embodiments, other types of battery cells known to those skilled in the art could be utilized.

The battery module 18 includes a battery module housing 52 holding at least one battery cell 53 therein. The battery module housing 52 has a rectangular ring-shaped frame 54 and first and second attachment portions 55, 56 extending from opposite sides of the frame 54. In one exemplary embodiment, the battery cell 53 is a lithium-ion battery cell. Of course, in alternative embodiments, other types of battery cells known to those skilled in the art could be utilized.

The battery module mounting assembly 40 is configured to fixedly hold the battery modules 16 and 18 on the base plate 62. The battery module mounting assembly 40 includes the base plate 62, a first retention clamp 70, a second retention clamp 80, and a third retention clamp 90.

The base plate 62 is configured to hold the battery modules 16-34 thereon. In one exemplary embodiment, the base plate 62 comprises a substantially uniform thickness steel sheet. The sidewall 42 is configured to be coupled to the base plate 62 and to surround at least a portion of the battery modules 16-34.

Referring to FIGS. 3-6, the first retention clamp 70 is configured to be coupled to the base plate 62 and to hold an attachment portion 49 of the battery module housing 46 therein and to hold an attachment portion 55 of the battery module housing 52 therein. The retention clamp 70 has a plate 110 of substantially uniform thickness. The plate 110 has a central rib 120, base portions 122, 124, clamping portions 130, 132, an intermediate rib 144, and weld joints 146, 148, 150, 152, 154. In one exemplary embodiment, the first retention clamp 70 is constructed of steel. Of course, in alternative embodiments, the first retention clamp 70 could be constructed of other materials known to those skilled in the art such as aluminum or plastic for example.

Figure 6:
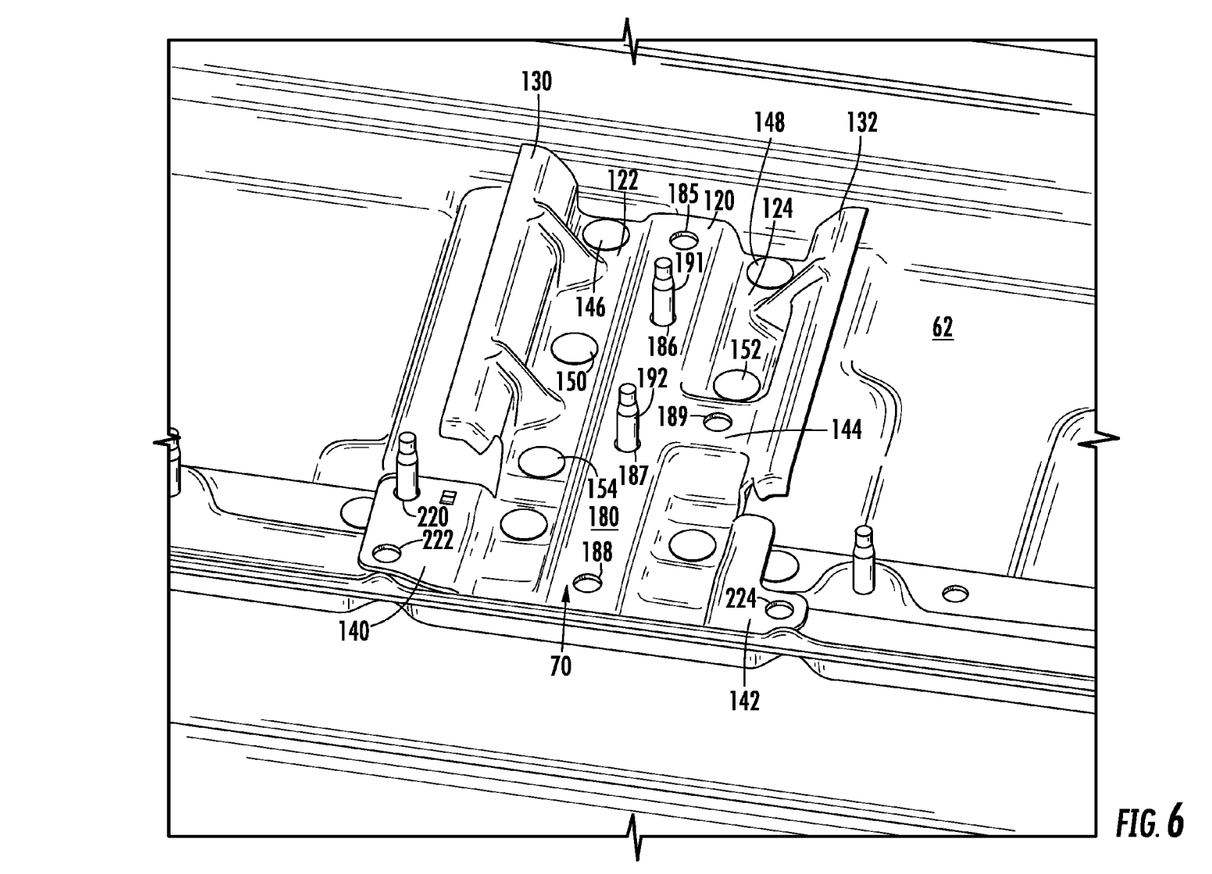
FIG. 6 is an enlarged schematic of a first retention clamp and a base plate utilized in the battery mounting system of FIG. 1.

In one exemplary embodiment, the central rib 120 extends longitudinally along substantially an entire length of the plate 110. The central rib 120 includes a flat portion 182 and leg portions 183, 184 extending downwardly and outwardly from the flat portion 182. The flat portion 182 has apertures 185, 186, 187, 188 extending therethrough. Bolts 191, 193 may extend through the apertures 186, 187, respectively, for coupling a current sensor (not shown) to the first retention clamp 70. The current sensor may be configured to measure an electrical current flowing through the battery modules 16-23.

The intermediate rib 144 extends perpendicular to the central rib 120. The intermediate rib 144 has an aperture 189 extending therethrough.

The base portions 122, 124 are coupled to and extend from first and second sides, respectively (corresponding to ends of the leg portions 183, 184, respectively) of the central rib 120. The base portions 122, 124 are fixedly attached to the base plate 62 utilizing the weld joints 146-154.

The clamping portion 130 is configured to hold the attachment portion 49 of the battery module housing 46 therein. The clamping portion 130 is coupled to and extends upwardly and outwardly from the base portion 122. The clamping portion 130 includes engagement sections 200, 202, 204. The engagement section 200 extends from the base portion 122 and is substantially perpendicular to the base portion 122. The engagement section 202 is substantially perpendicular to the engagement section 200. The engagement section 204 extends at an acute angle between the engagement sections 200, 202. The engagement sections 200, 202, 204 contact the attachment portion 49 of the battery module housing 46 for fixedly holding the battery module housing 48.

The clamping portion 132 is configured to hold the attachment portion 55 of the battery module housing 52 therein. The clamping portion 132 is coupled to and extends upwardly and outwardly from the base portion 124. The clamping portion 132 includes engagement sections 210, 212, 214. The engagement section 210 extends substantially perpendicular to the base portion 124. The engagement section 212 is substantially perpendicular to the engagement section 210. The engagement section 214 extends at an acute angle between the engagement sections 210, 212. The engagement sections 210, 212, 214 contact the attachment portion 55 of the battery module housing 52 for fixedly holding the battery module housing 52.

Referring to FIG. 6, the tab 140 extends outwardly from the base member 122 and covers a portion of the support rail 45. The tab 140 includes apertures 220, 222 extending therethrough. The tab 142 extends outwardly from the base member 124 and covers a portion of the support rail 45. The tab 144 includes an aperture 224 extending therethrough.

The weld joints 146, 150, 154 fixedly coupled the base portion 122 to the base plate 62. Similarly, the weld joints 148, 152 fixedly coupling base portion 124 to the base plate 62.

Figure 4:
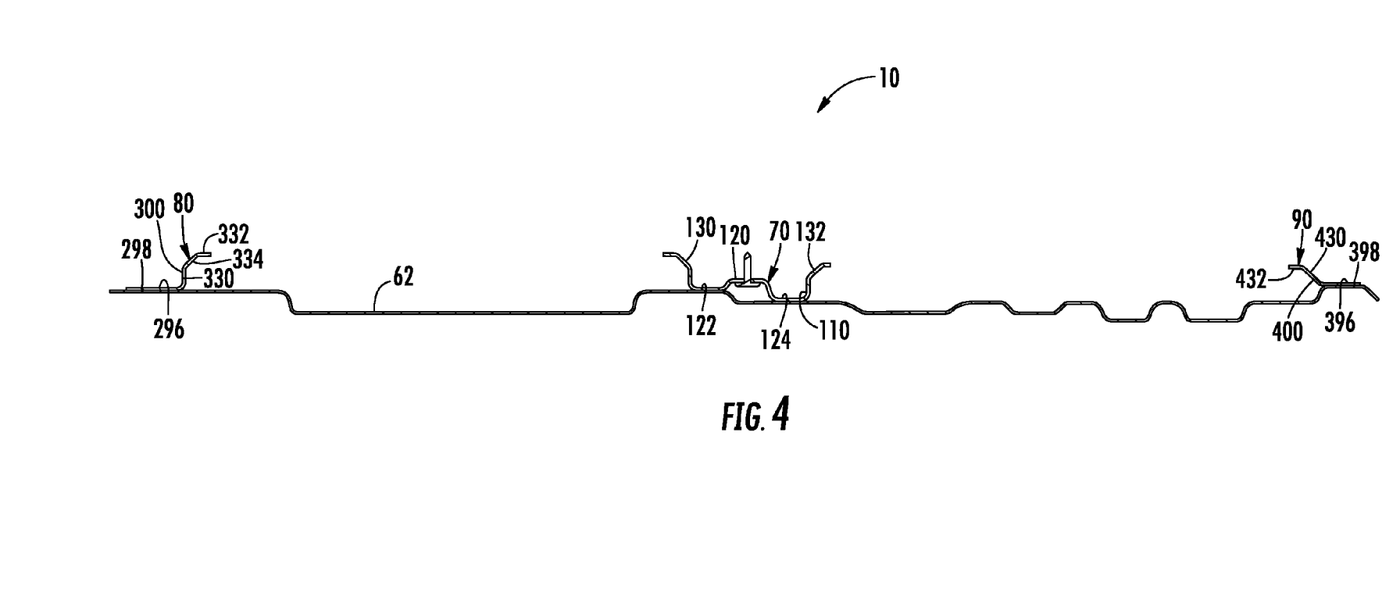
FIG. 4 is a cross-sectional schematic of a portion of the battery mounting system of FIG. 1.
Figure 5:
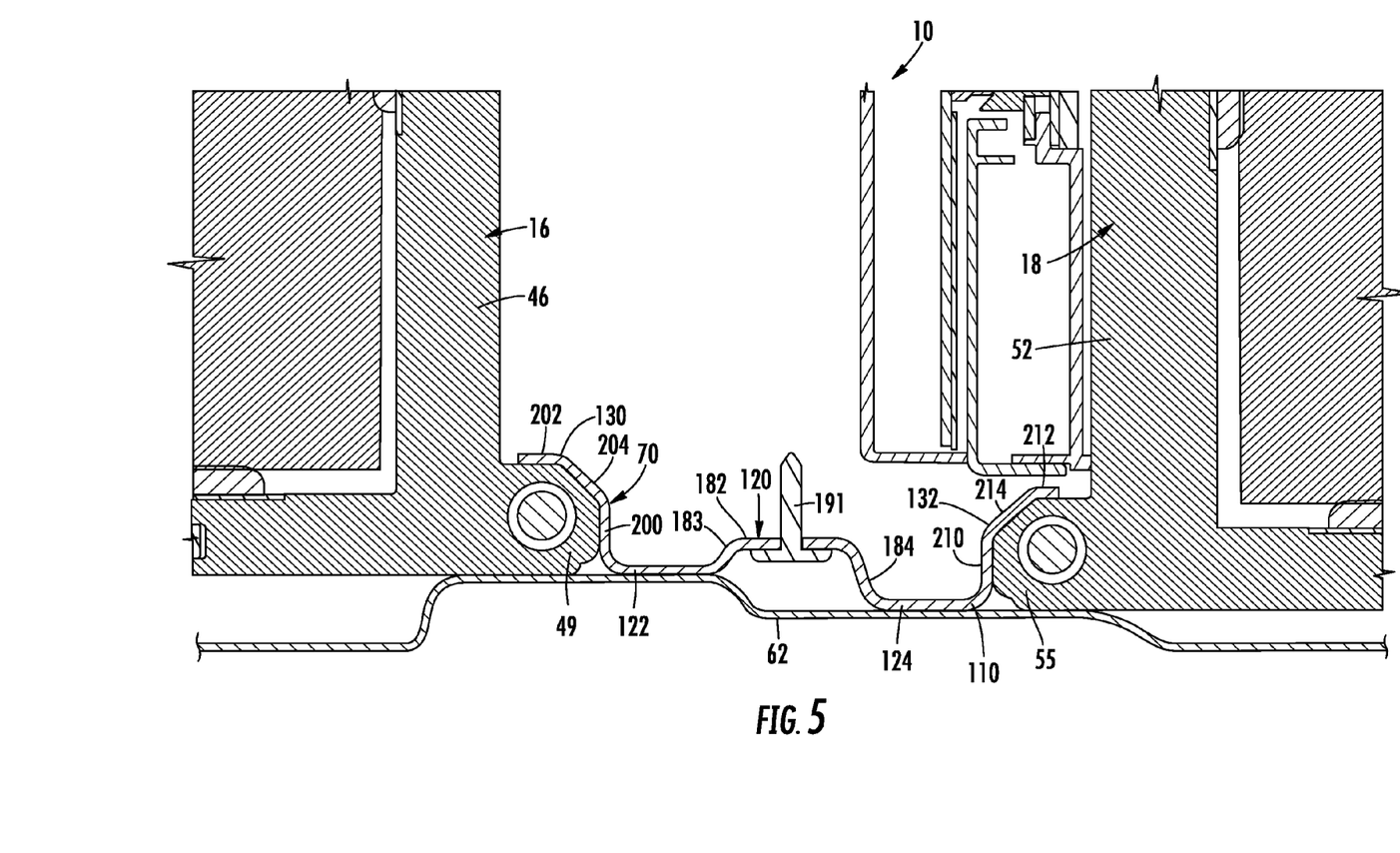
FIG. 5 is an enlarged cross-sectional schematic of a portion of the battery mounting system of FIG. 1.
Figure 7:
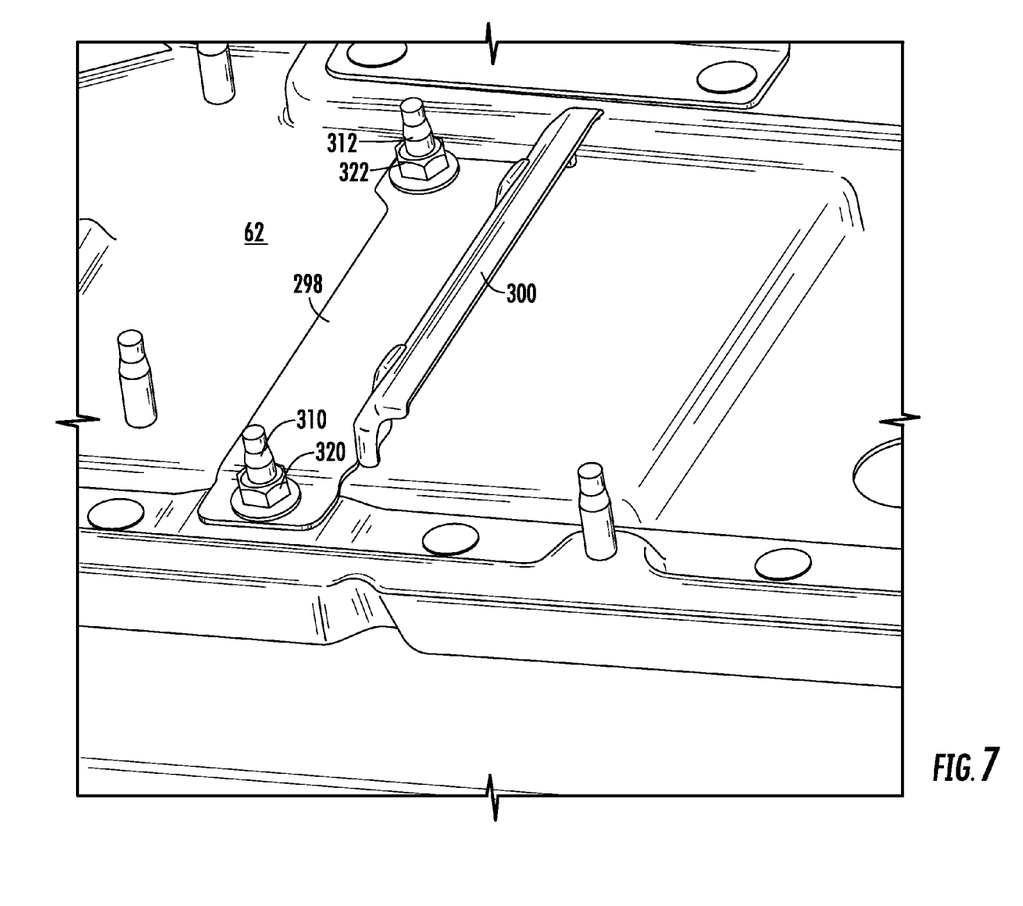
FIG. 7 is an enlarged schematic of a second retention clamp and a base plate utilized in the battery mounting system of FIG. 1.

Referring to FIGS. 3, 4 and 7, the second retention clamp 80 is configured to be coupled to the base plate 62 and to hold an attachment portion 50 of the battery module housing 46 therein. As shown, the second retention clamp 80 extends toward the first retention clamp 70 for holding the battery module 16 therebetween. The second retention clamp 80 has a plate 296 of substantially uniform thickness. The plate 296 includes a base portion 298 and a clamping portion 300. The second retention clamp 80 further includes bolts 310, 312 and nuts 320, 322 for fixedly attaching the second retention clamp 80 to the base plate 62. In one exemplary embodiment, the second retention clamp 80 is constructed of steel. Of course, in alternative embodiments, the second retention clamp 80 could be constructed of other materials known to those skilled in the art such as aluminum or plastic for example.

The base portion 298 is configured to contact the base plate 62. The clamping portion 300 is coupled to and extends outwardly from the base portion 298 toward the first retention clamp 70. The base portion 298 has first and second apertures extending therethrough for receiving the bolts 310, 312, respectively, therethrough. Nuts 320, 322 are placed on the bolts 310, 312, respectively, to fixedly couple the second retention clamp 80 to the base plate 62.

The clamping portion 300 includes engagement sections 330, 332, 334. The engagement section 330 extends from the base portion 298 and is substantially perpendicular to the base portion 298. The engagement section 332 is substantially perpendicular to the engagement section 330. The engagement section 334 extends at an acute angle between the engagement sections 330, 332. The engagement sections 330, 332, 334 contact the attachment portion 50 of the battery module housing 46 for fixedly holding the battery module housing 48.

Figure 8:
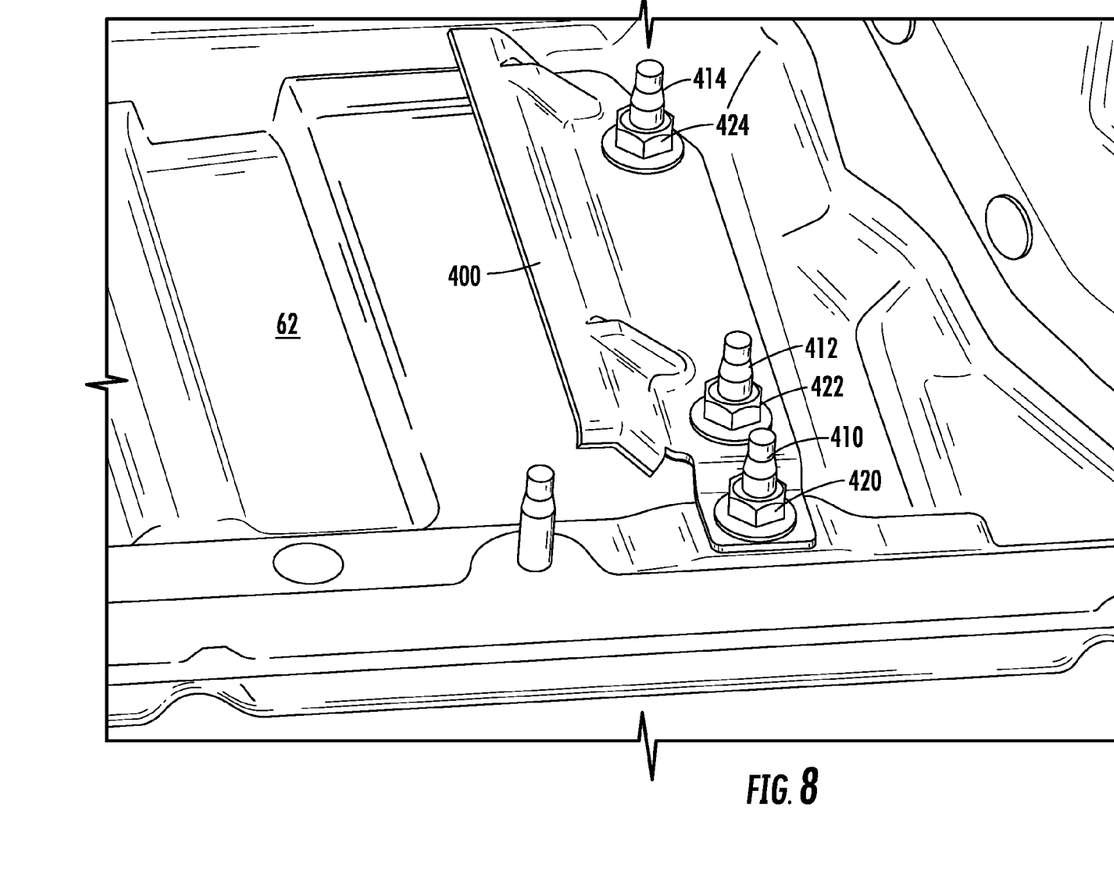
FIG. 8 is an enlarged schematic of a third retention clamp and a base plate utilized in the battery mounting system of FIG. 1.

Referring to FIGS. 3, 4 and 8, the third retention clamp 90 is configured to be coupled to the base plate 62 and to hold an attachment portion 56 of the battery module housing 52 therein. The third retention clamp 90 has a plate 396 of substantially uniform thickness. The plate 396 has a base portion 398 and a clamping portion 400 coupled to and extending outwardly from the base portion 398. The third retention clamp 90 further includes bolts 410, 412, 414 and nuts 420, 422, 424 for fixedly coupling the third retention clamp 90 to the base plate 62. In one exemplary embodiment, the third retention clamp 90 is constructed of steel. Of course, in alternative embodiments, the third retention clamp 90 could be constructed of other materials known to those skilled in the art such as aluminum or plastic for example.

The base portion 398 is configured to contact the base plate 62. The clamping portion 400 is coupled to and extends outwardly from the base portion 398 toward the first retention clamp 70. The base portion 398 has first, second, and third apertures extending therethrough for receiving the bolts 410, 412, 414, respectively therethrough. Nuts 420, 422, 422 are placed on the bolts 410, 412, 414, respectively, to fixedly couple the third retention clamp 90 to the base plate 62.

The clamping portion 400 includes engagement sections 430, 432. The engagement section 430 extends from the base portion 298 and is substantially perpendicular to the base portion 398. The engagement section 430 extends at an acute angle relative to the base portion 398. The engagement section 432 extends from the engagement section 430 and is substantially parallel to the base portion 398. The engagement sections 430, 432 contact the attachment portion 55 of the battery module housing 52 for fixedly holding the battery module housing 52.

Referring to FIGS. 1, 2, 4-9, and 11, a flowchart of a method for mounting the battery modules 16, 18 to the base plate 62 in accordance with another exemplary embodiment will now be explained.

Figure 9:
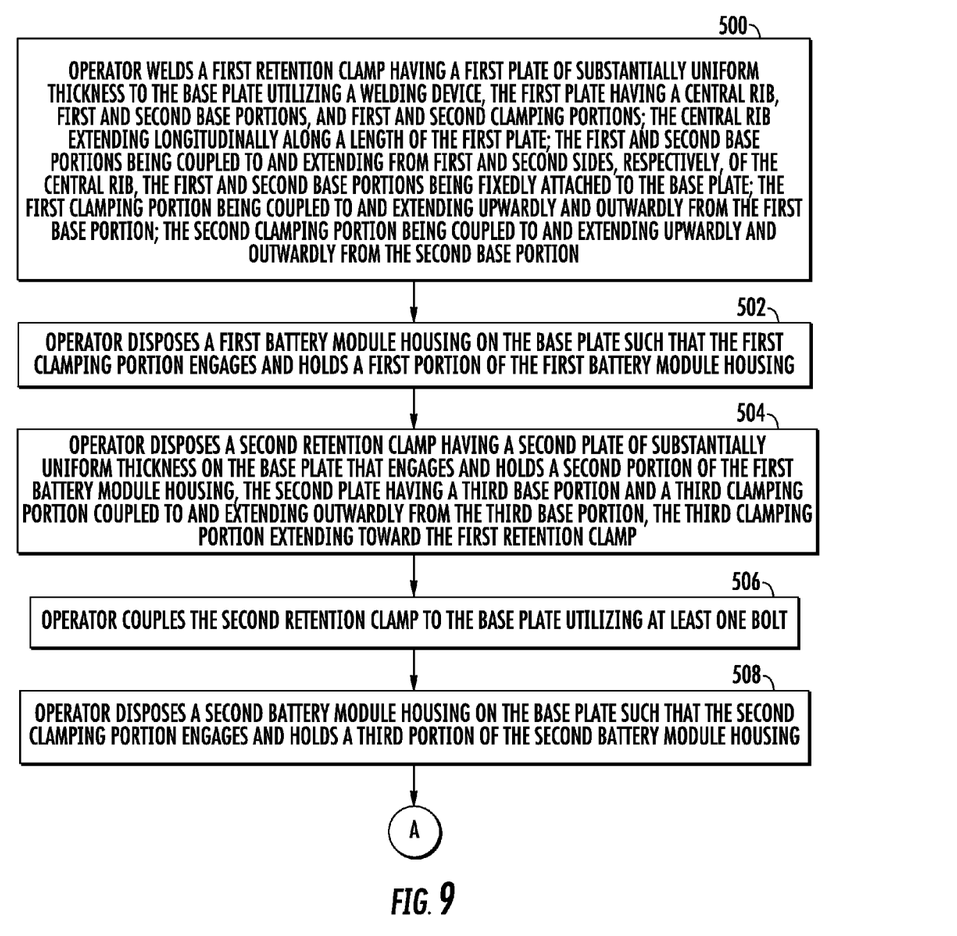
FIGS. 9 and 10 are flowcharts of a method for mounting a battery module to a base plate in accordance with another exemplary embodiment.
Figure 11:
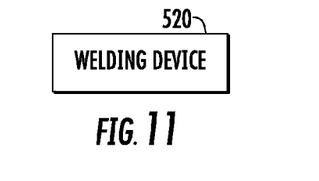
FIG. 11 is a block diagram of a welding device.

At step 500, an operator welds a first retention clamp 70 having a plate 110 of substantially uniform thickness to the base plate 62 utilizing a welding device 520. The plate 110 has a central rib 120, base portions 122, 124, and clamping portions 130, 132. The central rib 120 extends longitudinally along a length of the plate 110. The base portions 122, 124 are coupled to and extend from first and second sides, respectively, of the central rib 120. The base portions 122, 124 are fixedly attached to the base plate 62. The clamping portion 130 is coupled to and extends upwardly and outwardly from the base portion 122. The clamping portion 132 is coupled to and extends upwardly and outwardly from the base portion 124.

At step 502, the operator disposes the battery module housing 46 on the base plate 62 such that the clamping portion 130 engages and holds a portion 49 of the battery module housing 46.

At step 504, the operator disposes a second retention clamp 80 having a plate 296 of substantially uniform thickness on the base plate 62 that engages and holds a second portion 50 of the battery module housing 46. The plate 296 has a base portion 298 and a clamping portion 300 coupled to and extending outwardly from the base portion 298. The clamping portion 300 extends toward the first retention clamp 70.

At step 506, the operator couples the second retention clamp 80 to the base plate 62 utilizing at least one bolt 310.

Figure 10:
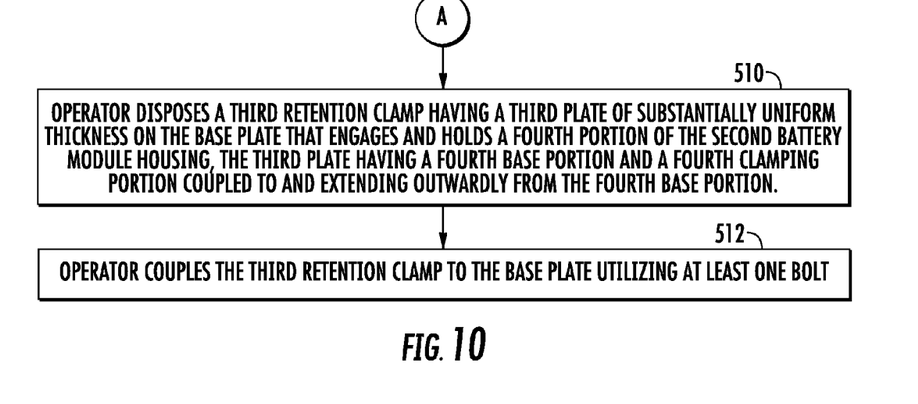

At step 508, the operator disposes the battery module housing 52 on the base plate 62 such that the clamping portion 132 engages and holds a portion 55 of the battery module housing 52.

At step 510, the operator disposes a third retention clamp 90 having a plate 396 of substantially uniform thickness on the base plate 62 that engages and holds a portion 56 of the battery module housing 52. The plate 396 has a base portion 398 and a clamping portion 400 coupled to and extending outwardly from the base portion 398.

At step 512, the operator couples the third retention clamp 90 to the base plate 62 utilizing at least one bolt 410.

The battery module mounting assembly 40 and the method for mounting a battery module to the base plate 62 provide a substantial advantage over other battery mounting systems and methods. In particular, the battery module mounting assembly 40 utilizes a first retention clamp 70 that has a central rib 120 extending between opposing clamping portions 130, 132 that provide substantial rigidity of the first retention clamp 70 along the longitudinal axis while securing sides of two battery modules. As a result of the central rib 120, a thickness of the plate 110 utilized to form the first retention clamp 70 can be reduced which decreases the weight of the first retention clamp 70. This decreased weight of the first retention clamp 70 is beneficial in electric vehicle applications and hybrid electric vehicle applications.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery module mounting assembly, comprising:
    a base plate for contacting and holding first and second battery module housings thereon; and
    a first retention clamp having a first plate of uniform thickness, the first plate having a central rib, first and second base portions, and first and second clamping portions; the central rib extending longitudinally along a length of the first plate;
    the first and second base portions coupled to and extending from first and second sides, respectively, of the central rib, the first and second base portions contacting the base plate and fixedly attached to the base plate;
    the first clamping portion coupled to and extending upwardly and outwardly from the first base portion, the first clamping portion engaging and holding a first portion of the first battery module housing between the first clamping portion and the base plate; and
    the second clamping portion coupled to and extending upwardly and outwardly from the second base portion, the second clamping portion engaging and holding a second portion of the second battery module housing between the second clamping portion and the base plate.

2. The battery module mounting assembly of claim 1, further comprising first and second weld joints fixedly attaching the first and second base portions, respectively, to the base plate.

3. The battery module mounting assembly of claim 1, wherein the first clamping portion includes at least first and second engagement sections, the first engagement section extending from the first base portion and being perpendicular to the first base portion, the second engagement section being perpendicular to the first engagement section.

4. The battery module mounting assembly of claim 3, wherein the first clamping portion further includes a third engagement section extending at an acute angle between the first and second engagement sections.

5. The battery module mounting assembly of claim 4, wherein the first, second, and third engagement sections contact the first portion of the first battery module housing.

6. The battery module mounting assembly of claim 5, wherein the second clamping portion includes at least fourth and fifth engagement sections, the fourth engagement section extending perpendicular to the second base portion, the fifth engagement section being perpendicular to the fourth engagement section.

7. The battery module mounting assembly of claim 6, wherein the second clamping portion further includes a sixth engagement section extending at an acute angle between the fourth and fifth engagement sections.

8. The battery module mounting assembly of claim 7, wherein the fourth, fifth, and sixth engagement sections contact the second portion of the second battery module housing.

9. The battery module mounting assembly of claim 1, further comprising:
    a second retention clamp having a second plate of uniform thickness, the second plate having a third base portion and a third clamping portion coupled to and extending outwardly from the third base portion, the third base portion coupled to the base plate utilizing at least one bolt, the third clamping portion extending toward the first retention clamp and engaging and holding a third portion of the first battery module housing.

10. The battery module mounting assembly of claim 9, wherein the third clamping portion includes at least first and second engagement sections, the first engagement section extending from the third base portion and being perpendicular to the third base portion, the second engagement section being perpendicular to the first engagement section.

11. The battery module mounting assembly of claim 10, wherein the third clamping portion further includes a third engagement section extending at an acute angle between the first and second engagement sections.

12. The battery module mounting assembly of claim 11, wherein the first, second, and third engagement sections contact the third portion of the first battery module housing.

13. The battery module mounting assembly of claim 9, further comprising:
   a third retention clamp having a third plate of uniform thickness, the third plate having a fourth base portion and a fourth clamping portion coupled to and extending outwardly from the fourth base portion, the fourth base portion coupled to the base plate utilizing at least one bolt, the fourth clamping portion extending toward the first retention clamp and engaging and holding a fourth portion of the second battery module housing.

14. The battery module mounting assembly of claim 13, wherein the fourth clamping portion includes at least first and second engagement sections, the first engagement section extending at an acute angle relative to the third base portion, the second engagement section extending from the first engagement section and being parallel to the third base portion.

15. The battery module mounting assembly of claim 14, wherein the first and second engagement sections contact the fourth portion of the second battery module housing.

16. The battery module mounting assembly of claim 1, wherein a height of the first retention clamp being less than a height of each of the first and second battery module housings.

17. The battery module mounting assembly of claim 1, wherein the central rib forming an open space between the central rib and the base plate.

18. The battery module mounting assembly of claim 1, wherein the first base portion of the first retention clamp extending parallel to the second base portion of the first retention clamp and disposed a predetermined vertical distance above the second base portion.

19. The battery module mounting assembly of claim 1, wherein:
   the first clamping portion and the base plate forming a first open region therebetween that receives the first portion of the first battery module housing therein; and
   the second clamping portion and the base plate forming a second open region therebetween that receives the second portion of the second battery module housing therein.

20. A battery module mounting assembly, comprising:

a base plate for holding first and second battery module housings thereon; and a first retention clamp having a first plate of uniform thickness, the first plate having a central rib, first and second base portions, and first and second clamping portions, a height of the first retention clamp being less than a height of each of the first and second battery module housings;

the central rib extending longitudinally along a length of the first plate, the central rib forming an open space between the central rib and the base plate;

the first and second base portions coupled to and extending from first and second sides, respectively, of the central rib, the first and second base portions contacting the base plate and fixedly attached to the base plate;

the first clamping portion coupled to and extending upwardly and outwardly from the first base portion, the first clamping portion and the base plate forming a first open region therebetween that receives a first portion of the first battery module housing therein, the first clamping portion engaging and holding the first portion of the first battery module housing between the first clamping portion and the base plate; and the second clamping portion coupled to and extending upwardly and outwardly from the second base portion, the second clamping portion and the base plate forming a second open region therebetween that receives a second portion of the second battery module housing therein, the second clamping portion engaging and holding the second portion of the second battery module housing between the second clamping portion and the base plate.

* * * * *